US012505997B2

United States Patent
(12) United States Patent
Casper et al.

(10) Patent No.: US 12,505,997 B2
(45) Date of Patent: Dec. 23, 2025

(54) ATMOSPHERIC PURGE SYSTEM AND METHOD FOR LASER ABLATION SAMPLE PROCESSING

(71) Applicant: Elemental Scientific, Inc., Omaha, NE (US)

(72) Inventors: Mark Casper, Blair, NE (US); Ross Coenen, Omaha, NE (US); Michael P. Field, Papillion, NE (US); Daniel R. Wiederin, Omaha, NE (US)

(73) Assignee: Elemental Scientific, Inc., Omaha, NE (US)

(*) Notice: Subject to any disclaimer, the term of this patent is extended or adjusted under 35 U.S.C. 154(b) by 468 days.

(21) Appl. No.: 18/184,205

(22) Filed: Mar. 15, 2023

(65) Prior Publication Data

US 2023/0298879 A1 Sep. 21, 2023

Related U.S. Application Data

(60) Provisional application No. 63/319,840, filed on Mar. 15, 2022.

(51) Int. Cl.
*H01J 49/10* (2006.01)
*H01J 49/04* (2006.01)

(52) U.S. Cl.
CPC ........ *H01J 49/105* (2013.01); *H01J 49/0495* (2013.01)

(58) Field of Classification Search
CPC .. H01J 49/105; H01J 49/0495; H01J 49/0404; H01J 49/0463
See application file for complete search history.

(56) References Cited

U.S. PATENT DOCUMENTS 10,211,038 B2 2/2019 Nagata et al.
11,441,978 B1 * 9/2022 Wiederin ................ G01N 1/22
(Continued)

FOREIGN PATENT DOCUMENTS

KR 102181778 B1 11/2020
WO WO-2017110118 A1 * 6/2017 .......... H01J 49/0468
WO 2020160604 A1 8/2020

OTHER PUBLICATIONS

PCT International Search Report and Written Opinion for PCT/US2023/015291, dated Jul. 11, 2023.

*Primary Examiner* — Wyatt A Stoffa
*Assistant Examiner* — Christopher J Gassen
(74) *Attorney, Agent, or Firm* — Kevin E. West; Advent, LLP

(57) ABSTRACT

Systems and methods are described for controlling flow of a purge gas introduced to an ablation cell between samples to remove atmospheric gas. A system embodiment includes, but is not limited to, a spray chamber including a spray chamber body, a transfer gas inlet configured to receive gas from a laser ablation sample cell, a first outlet line configured to transfer gas from the spray chamber to an inductively-coupled plasma torch, and a second outlet line coupled to the spray chamber body, the second gas outlet having a larger internal cross-sectional area than an internal cross-sectional area of the first outlet line; and a valve fluidically coupled to the second outlet line, the valve configured to transition between at least an open configuration configured to permit transfer gas through the second outlet line and a closed configuration configured to prevent transfer of gas through the second outlet line.

19 Claims, 9 Drawing Sheets

(56) References Cited

U.S. PATENT DOCUMENTS

| | | | |
|---|---|---|---|
| 2004/0056368 | A1 | 3/2004 | Hirahara et al. |
| 2014/0224775 | A1 | 8/2014 | Sharp et al. |

* cited by examiner

ATMOSPHERIC PURGE SYSTEM AND METHOD FOR LASER ABLATION SAMPLE PROCESSING

CROSS-REFERENCE TO RELATED APPLICATIONS

The present application claims the benefit of 35 U.S.C. § 119(e) of U.S. Provisional Application Ser. No. 63/319,840, filed Mar. 15, 2022, and titled "ATMOSPHERIC PURGE SYSTEM AND METHOD FOR LASER ABLATION SAMPLE PROCESSING." U.S. Provisional Application Ser. No. 63/319,840 is herein incorporated by reference in its entirety.

BACKGROUND

Laser Ablation Inductively Coupled Plasma Mass Spectrometry (LA-ICPMS) and Laser Ablation Inductively Coupled Plasma Optical Emission Spectrometry (LA-ICP-OES) techniques can be used to analyze the composition of a target, such as a solid or liquid target material. Often, a sample of the target is provided to an analysis system in the form of an aerosol (i.e., a suspension of solid and possibly liquid particles and/or vapor in a carrier gas, such as helium gas). The sample is typically produced by arranging the target within a laser ablation chamber, introducing a flow of a carrier gas within the chamber, and ablating a portion of the target with one or more laser pulses to generate a plume containing particles and/or vapor ejected or otherwise generated from the target, suspended within the carrier gas. Entrained within the flowing carrier gas, the target material is transported to an analysis system via a transport conduit to an inductively coupled plasma (ICP) torch where it is ionized.

A plasma containing the ionized particles and/or vapor is then analyzed by an analysis system, such as a mass spectrometry (MS), optical emission spectrometry (OES), isotope ratio mass spectrometry (IRMS), or electro-spray ionization (ESI) system. For example, ICP spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

SUMMARY

Systems and methods are described for controlling flow of a purge gas introduced to an ablation cell between samples to remove atmospheric gas utilizing a mixing cell with two outputs, one of which maintains over time a consistent internal diameter and the second of which utilizes a valve to control output flow, without extinguishing a plasma used by an inductively coupled plasma analysis system for measuring analytes in the samples. A system embodiment includes, but is not limited to, a spray chamber including a spray chamber body, a transfer gas inlet coupled to the spray chamber body and configured to receive gas from a laser ablation sample cell, a first outlet line coupled to the spray chamber body and configured to transfer gas from the spray chamber to an inductively-coupled plasma torch, and a second outlet line coupled to the spray chamber body, the second gas outlet having a larger internal cross-sectional area than an internal cross-sectional area of the first outlet line; and a valve fluidically coupled to the second outlet line, the valve configured to transition between at least an open configuration configured to permit transfer gas through the second outlet line and a closed configuration configured to prevent transfer of gas through the second outlet line.

A system embodiment includes, but is not limited to, an inductively-coupled plasma torch configured to ionize at least a portion of a gas from a laser ablation sample cell; a spray chamber fluidically coupled to the inductively-coupled plasma torch, the spray chamber including a spray chamber body, a transfer gas inlet coupled to the spray chamber body and configured to receive gas from the laser ablation sample cell, a first outlet line coupled to the spray chamber body and configured to transfer gas from the spray chamber to the inductively-coupled plasma torch, and a second outlet line coupled to the spray chamber body, the second gas outlet having a larger internal cross-sectional area than an internal cross-sectional area of the first outlet line; and a valve fluidically coupled to the second outlet line, the valve configured to transition between at least an open configuration configured to permit transfer gas through the second outlet line and a closed configuration configured to prevent transfer of gas through the second outlet line, wherein a difference in the respective internal cross-sectional areas of the first outlet line and the second outlet line is configured to permit transfer of a majority of the transfer gas through the second outlet line when the valve is in the open configuration to prevent extinguishing of a plasma at the inductively-coupled plasma torch.

A method embodiment includes, but is not limited to, transferring gas from a laser ablation sample cell to an inductively-coupled plasma torch via a transfer line that has an unimpeded internal diameter over time between individual samples taken by the laser ablation sample cell; and preventing transfer of gas from the laser ablation sample cell to the inductively-coupled plasma torch through operation of a valve fluidically coupled between the laser ablation sample cell and the inductively-coupled plasma torch.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

DETAILED DESCRIPTION

Overview

Figure 1:
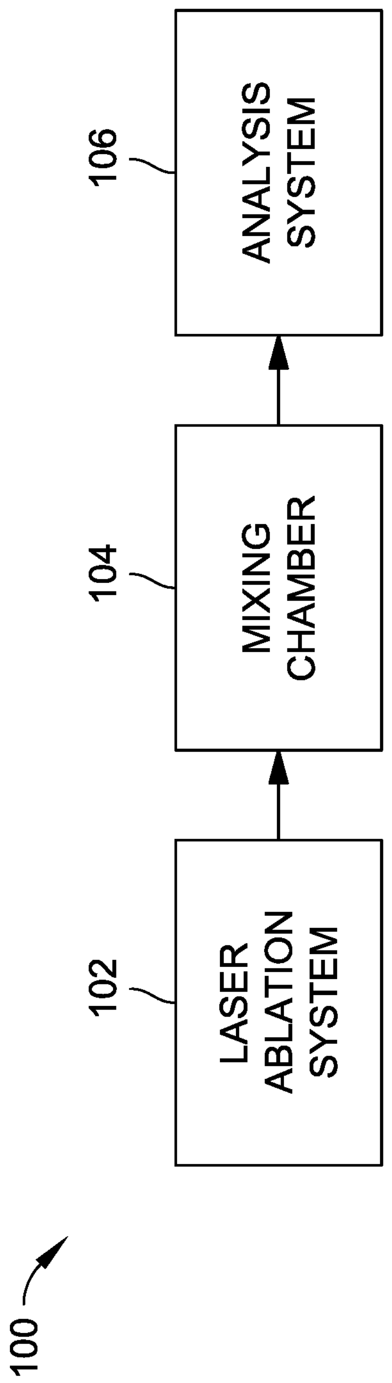
FIG. 1 is a diagrammatic illustration of a system for controlling flow of a purge gas introduced to an ablation cell between samples, in accordance with example implementations of the present disclosure.
Figure 2:
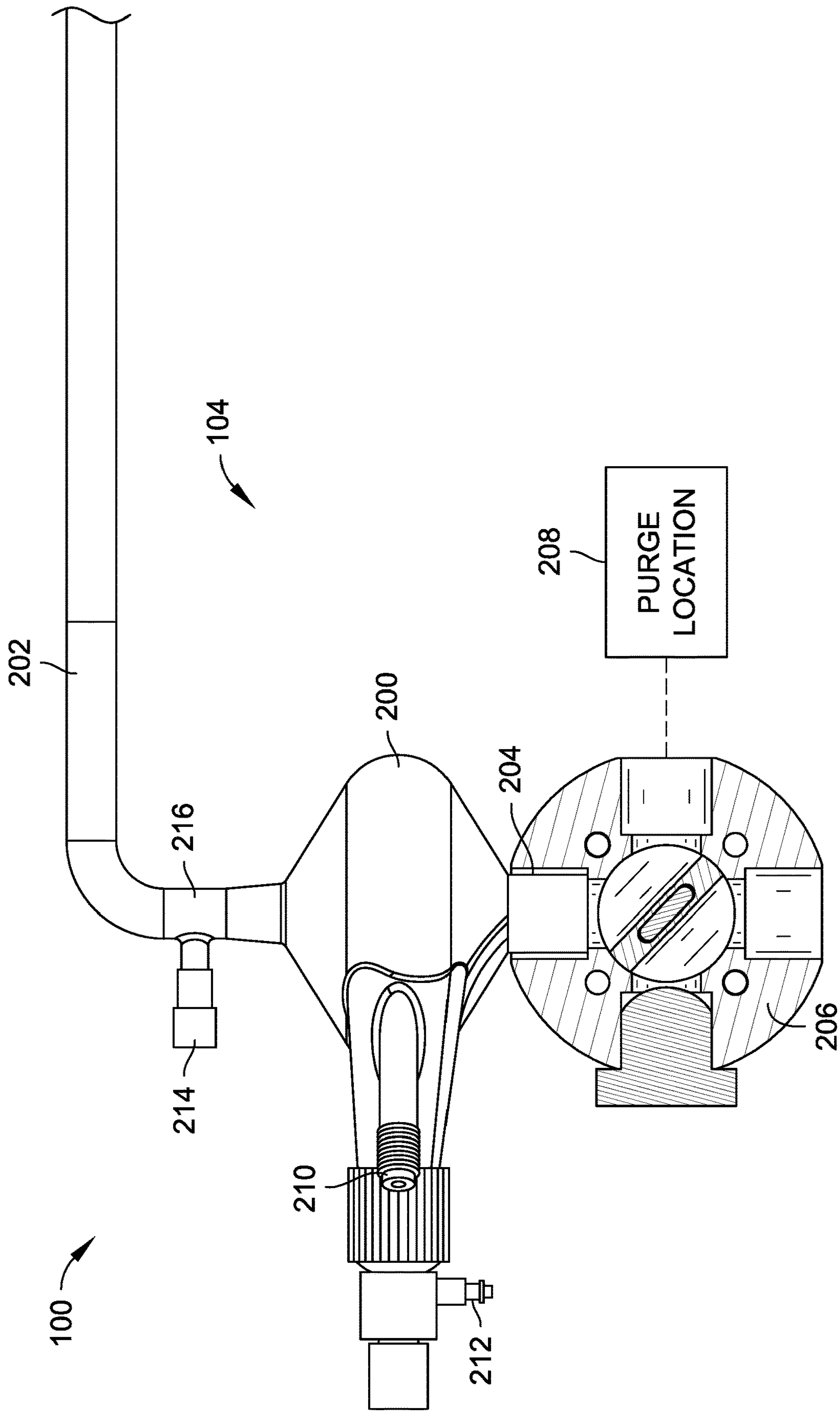
FIG. 2 is a schematic of a mixing chamber and valve configured to maintain a constant internal diameter for a gas transfer line coupled between a laser ablation system and an analytic system, in accordance with example implementations of the present disclosure.
Figure 3A:
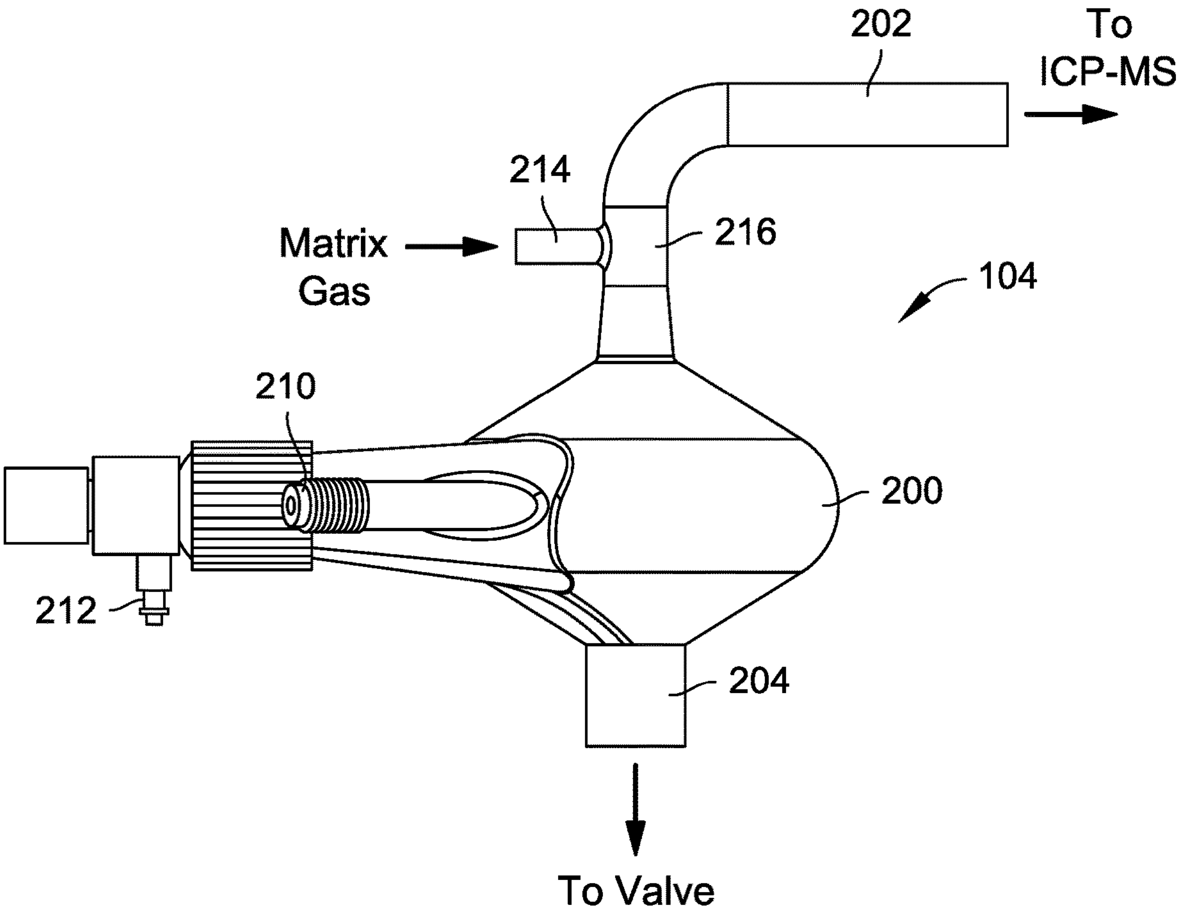
FIG. 3A is a side view of the mixing chamber of FIG. 2.
Figure 3B:
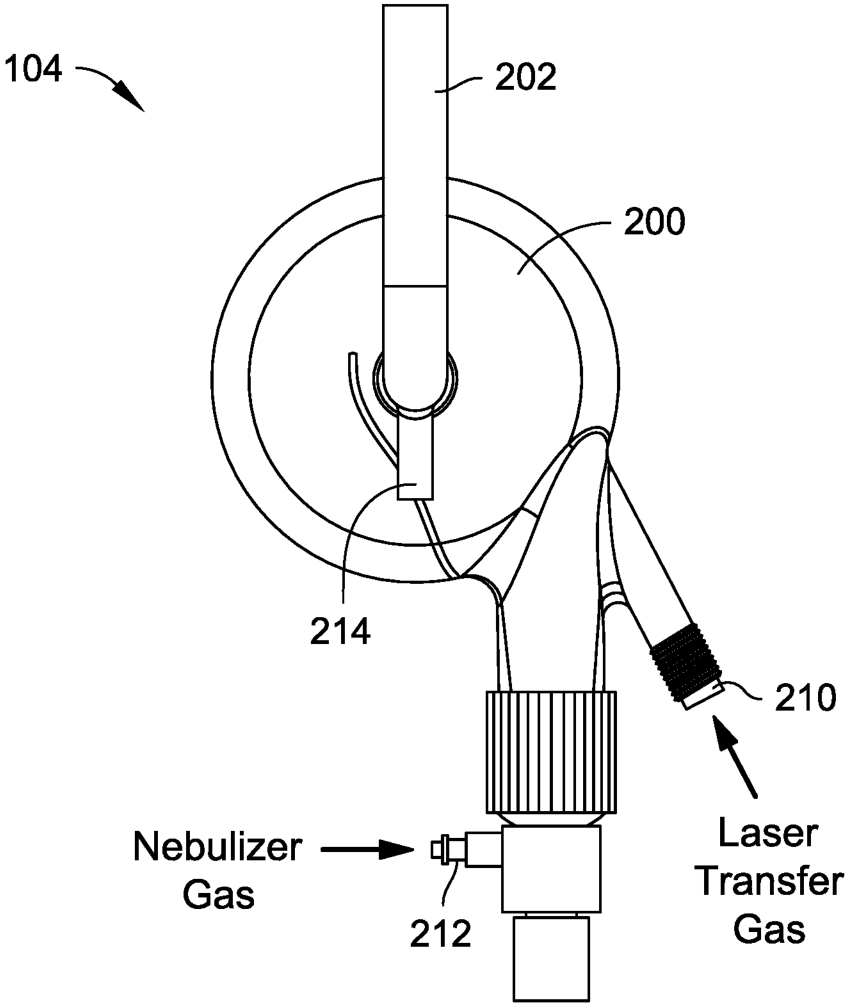
FIG. 3B is a top view of the mixing chamber of FIG. 2.

Laser ablation is a sampling method which uses a focused beam of pulsed laser light in a laser ablation cell to convert a portion of a solid or liquid sample from a target object into aerosol phase which is transported on a gas stream into an analyzer, such as an Inductively-Coupled Plasma Mass Spectrometer (ICPMS). Multiple laser pulses may be used to ablate different areas of the sample to produce adequate signal and to ensure that a representative sample has been collected for analysis.

Laser ablation systems can utilize automated sample loading techniques to facilitate automated handling of multiple samples for a single laser ablation cell. For example, the laser ablation system can include a sample loading system (e.g., a sample carousel) to house multiple samples and to serially introduce the samples to the laser ablation cell to generate individual ablated samples. For example, the sample carousel can rotate to bring a given sample into proximity beneath a laser ablation cell. A piston positioned beneath the carousel can vertically lift a given sample into or against the laser ablation cell and hold the sample in position during laser ablation sampling. After transfer of the ablated target material from the laser ablation cell to the analyzer, the piston can lower the sample, where the carousel positions the next sample into proximity beneath the laser ablation cell. During changeover between samples, atmospheric gas can enter an exposed laser ablation cell, such as where lowering of the piston exposes a bottom portion of the laser ablation cell to the atmosphere or entrained atmospheric gases present within the laser ablation system. If the atmospheric gas were sent to the analyzer, the plasma of the ICP torch could be extinguished, causing downtime of the ICP analyzer during subsequent reigniting the ICP torch and performing any recalibration or stabilization techniques, which in turn reduces sample throughput and increases costs for operation of the ICP analyzer (e.g., due to increased nebulizer gas usage, power requirements, and the like).

One option to prevent atmospheric gas from entering the ICP torch is to utilize a pinch valve to selectively choose a pathway for gas from the laser ablation cell to follow. For example, a transfer line from the laser ablation cell can split into two gas lines made of pliable/flexible material and enter a pinch valve. The first gas line connects the laser ablation cell with the ICP torch and the second gas line connects the laser ablation cell with a purge location (e.g., vent, waste, etc.). During changeover between samples, the pinch valve pinches closed the first gas line by compressing the flexible tubing to prevent atmospheric gas from reaching the ICP torch, while the second gas line remains open to purge the atmospheric gas. During sampling, the pinch valve opens the first gas line and pinches closed the second gas line by compressing the flexible tubing to prevent sample gas from being purged while permitting sample to pass through the first gas line to the ICP torch.

However, pinch valves introduce many drawbacks to operation of a laser ablation system due to frequent changing of the internal diameter of the tubing that passes between the laser ablation cell and the ICP analyzer. For instance, the opening and closing operation of the pinch valves can be unreliable, due to sticking of the flexible tubing between opening/closing operations (e.g., the tube interior walls stick to themselves), due to deformation of the flexible tube over time (e.g., stiffening of the flexible tube material), or other reasons. Sticking of the tubing or other tube deformation can increase over time due to mechanical failure or aging of the tubing. Additionally, the tubing can be prone to clogging, where sample or atmospheric particulates can build at the pinch sites, which can affect the consistency of sample analysis by the ICP analyzer and require frequent tube maintenance or replacement, oftentimes noticeable only after perceived sample procedure failures, which can lead to reprocessing of the sample after tube maintenance and the associated time loss therewith. Such mechanical issues with the pinch valves can result in variable cell pressure of the laser ablation cell during sample processing and variable sensitivity of the ICP analyzer to measure analytes in the sample gas transferred from the laser ablation cell, among other issues.

Accordingly, in one aspect, the present disclosure is directed to systems and methods for controlling flow of a purge gas introduced to an ablation cell between samples (e.g., samples serially introduced to a laser ablation cell via a carousel loading system or the like) to remove atmospheric gas utilizing a mixing cell with two outputs without extinguishing a plasma used by an inductively coupled plasma analysis system for measuring analytes in the samples. One output maintains an unimpeded internal flow path (e.g., an internal cross section that does not appreciably change over time) and the second output utilizes a valve to control output flow. The first output line couples the mixing cell to the ICP torch, with a line that maintains an unimpeded internal flow path over time (e.g., consistent internal diameter over time, no pinching, no valve, no flow path deviation, etc.), which provides a conduit through which the sample gas can reach the ICP analyzer. The second output line has a significantly larger opening than the first output line and couples the mixing cell to a purge location via a valve that can open and close to permit or prevent gas from being purged from the mixing cell.

When the valve is opened, the large opening has an open flow path, and most of the inlet streams into the mixing chamber will flow out the purge path due to resistance from the smaller opening in the other direction towards the ICP torch (e.g., due to backpressure in the tubing). When the large opening has a closed flow path (e.g., due to the valve being closed), the inlet streams into the mixing chamber will be directed entirely to the ICP. This allows for a purge gas to be added to the ablation cell and have the entire path to the mixing cell be purged without needing a physical clamp or restriction on the system. In implementations, the valve includes an internal flow path through the valve that has an inner diameter that matches the inner diameter of the second output line of the mixing chamber to prevent material buildup within the valve. In implementations, the internal flow path has a consistent inner diameter between an input port for the valve and a flow selector within the valve that transitions the flow path between the open and closed configurations. The systems and methods described herein provide for substantially constant cell pressure for the laser ablation sample between samples and avoid the inconsistent cell pressures introduced by use of pinch valves.

Example Implementations

Referring generally to FIGS. 1 through 7, systems 100 are shown for controlling flow of a purge gas introduced to a laser ablation cell between samples to remove atmospheric gas without extinguishing a plasma used by an inductively coupled plasma analysis system, in accordance with example implementations of the present disclosure. The system 100 generally includes a laser ablation system 102 in fluid communication with each of a mixing chamber 104 and an analysis system 106. The laser ablation system 102 includes a laser ablation cell holding a sample while a focused beam of pulsed laser light converts a portion of the sample into aerosol phase which is transported on a gas stream into the mixing chamber 104. The mixing chamber 104 can introduce one or more additional gas streams to mix with the sample gas stream and also fluidically couples the laser ablation system 102 with the analysis system 106, which in implementations is an inductively-coupled plasma analysis system, such as an ICP-MS system, used to measure one or more analytes in the sample gas stream. The mixing chamber 104 also fluidically couples the laser ablation system 102 with a purge location (e.g., vent, waste, etc.) to purge atmospheric gases present in the ablation chamber introduced during changeover of one sample to the next sample in the laser ablation cell to prevent the purge gases from extinguishing the ICP plasma.

The mixing chamber 104 is shown in FIGS. 2-4B including a mixing chamber body 200 having a first outlet line 202 and a second outlet line 204. The first outlet line 202 is configured to fluidically couple the mixing chamber 104 with an ICP torch 400 of the analysis system 106 for transferring the sample gas from the laser ablation system 102 to the analysis system 106. The second outlet line 204 is coupled, directly or indirectly via an intervening tube, with a valve 206 configured to transition between at least an open configuration (e.g., shown in FIGS. 2 and 4B), which fluidically couples the mixing chamber 104 with a purge location 208, and a closed configuration (e.g., as shown in FIG. 4A), which prevents the flow of gas through the second outlet line 204. For example, the valve 206 can fluidically couple the second outlet line 204 with a plugged or otherwise blocked valve port in the closed configuration to prevent the flow of fluids through the valve 206.

While the valve 206 is shown coupled with the bottom of the mixing chamber body 200 with the second outlet line 204 substantially entirely within the valve 206, the system 100 is not limited to such configuration. For example, the second outlet line 204 can be a longer tube to substantially space the mixing chamber body 200 from the valve 206, with a particle trap or filter coupled between the valve 206 and the mixing chamber 104 to remove particles entrained in the purge gas. In implementations, one or more of the fluid lines in the system 100 includes a grounded fluoropolymer tubing. For example, one or more of the first outlet line 202 and the second outlet line 204 can be formed from grounded fluoropolymer tubing having a carbon filament for grounding the lines.

The first outlet line 202 generally has a smaller internal cross-sectional area for gas flow therethrough as compared to the second outlet line 204. For example, the second outlet line 204 can have an internal diameter that is between approximately 4 and 20 times larger than the internal diameter of the first outlet line 202. While the first outlet line 202 or portions downstream from the first outlet line 202 (e.g., torch injector, transfer tubing, etc.) can transition from one cross-sectional area to another (e.g., transitioning to a smaller cross-sectional area when entering the ICP torch injector), the cross-section of the first outlet line 202 and the downstream lines does not change over time, whereas pinch valves intentionally change the cross-section to impede or otherwise prevent the flow of fluid therethrough. The smaller internal cross-sectional area for the first outlet line 202 provides flow resistance for gas flowing into the mixing chamber 102, such that most, all, or substantially all of the gas entering the mixing chamber 102 flows through the second outlet line 204 when the valve 206 is in the open configuration (e.g., during purge cycles of the laser ablation system 102). For instance, backpressure caused by the reduction in internal diameter of the first outlet line 202 compared to the second outlet line 204 can cause the gas flowing into the mixing chamber to be directed into the second outlet line 204 for transfer to the purge location 208. In an example implementation, for the second outlet line 204 having an internal diameter that is 5.25 times larger than the internal diameter of the first outlet line 202 (e.g., for a 1.6 mm internal diameter for the first outlet line 202 and a 8.4 mm internal diameter for the second outlet line 204), backpressure will be approximately 27 times higher going into the first outlet line 202 as compared to the second outlet line 204. Backpressure differences can also be introduced or adjusted based on a length of the first outlet line 202, where longer tubes generally result in higher backpressures based on internal diameter differences between the first outlet line 202 and the second outlet line 204.

The mixing chamber 104 is shown including a transfer gas inlet port 210 to receive gas transferred from the laser ablation cell of the laser ablation system 102, which can include sample gas, purge gas, or other gases dependent on operation of the laser ablation system 102. The mixing chamber 104 also includes one or more ports to introduce fluids for mixing with gas received via the transfer gas inlet port 210. For example, the mixing chamber 104 is shown with a mixing port 212 for introducing a nebulizer gas (e.g., Ar) to mix with the sample gas within the mixing chamber body 200, which can improve signal smoothing and stability during analysis by the analysis system 106. Alternatively or additionally, the mixing chamber 104 can include a gas addition port 214 having an introduction region coupled to the first outlet line 202 (e.g., positioned on a vertical portion 216 above the mixing chamber body 200) to introduce gas to assist with sample matrix reduction for samples transferred to the analysis system 106, where large matrix particles can douse the plasma of the ICP torch. For instance, gas introduced to the gas addition port 214 can impact large matrix particles against the vertical portion 216 for transfer back into the mixing chamber body 200, preventing the large matrix particles from reaching the ICP torch of the analysis system 106. As an example, the gas addition port 214 can direct gas into the first outlet line 202 at a cross-flow orientation (e.g., perpendicular, substantially perpendicular, or otherwise offset) with respect to flow of fluid traveling through the first outlet line 202 to impact large matrix particles against the vertical portion 216 for transfer back into the mixing chamber body 200.

Figure 4A:
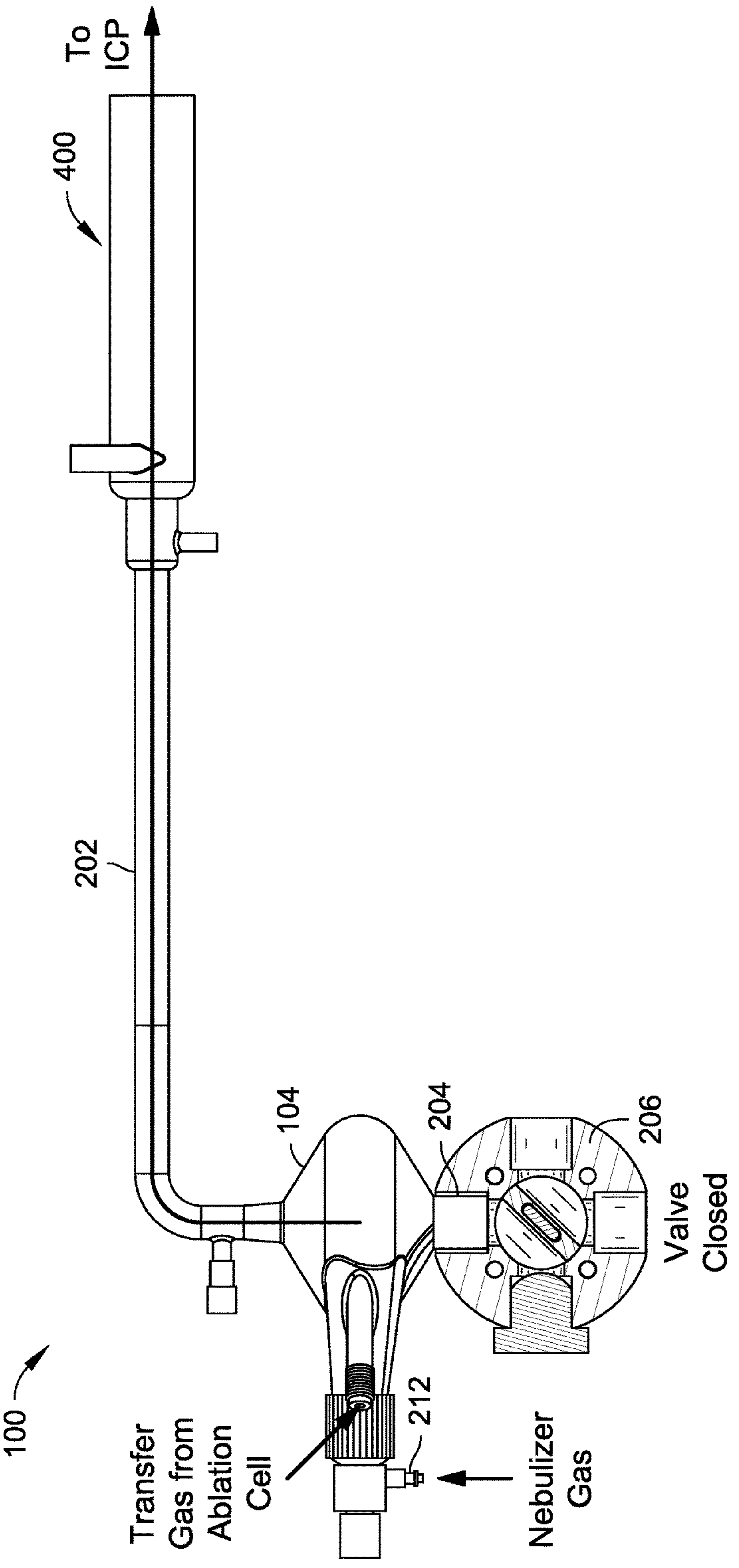
FIG. 4A is a schematic of the mixing chamber and valve of FIG. 2, shown in a sample transfer configuration.

The system 100 is shown in FIG. 4A during a sampling operation of the laser ablation system 102, with the valve 206 being in the closed configuration to prevent the flow of gas through the second outlet line 204. During the sampling operation, the transfer gas from the ablation cell of the laser ablation system 102 enters the mixing chamber 104 via the transfer gas inlet port 210 and is directed through the mixing chamber body 200 and into the first outlet line 202, which transfers the transfer gas to the ICP torch of the analysis system 106. A nebulizer gas can be introduced to the mixing chamber 104 via the mixing port 212 to mix the nebulizer gas and the transfer gas within the mixing chamber body 200 for subsequent passage out the first outlet line 202. The system 100 can maintain the sampling operation configuration during the generation of ablated sample and while the sample cell remains closed to the atmosphere. With the sample cell closed to the atmosphere, atmospheric gases are unable to enter the mixing chamber 104 and therefore do not threaten to extinguish the plasma generated by the ICP torch 400.

Figure 4B:
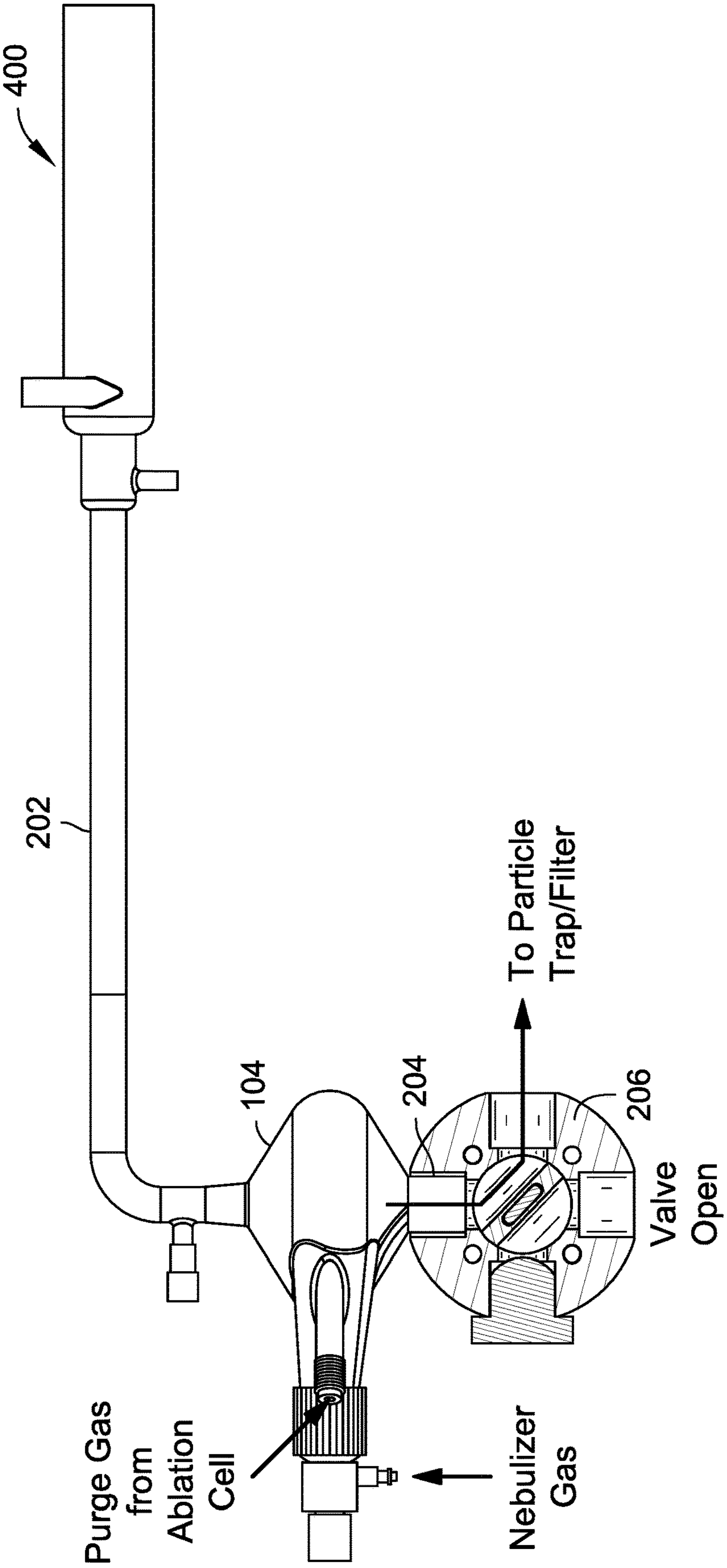
FIG. 4B is a schematic of the mixing chamber and valve of FIG. 2, shown in a purge configuration.

When the system 100 is ready to transition to a new sample and thereby open the sample cell to the atmosphere (e.g., another sample loaded on a sample carousel is available to be process by the laser ablation system 102), the system 100 can transition to a purge configuration, an example of which is shown in FIG. 4B, where the valve 206 is in the open configuration. During the purge configuration, purge gas (which can include atmospheric gas) from the ablation cell of the laser ablation system 102 enters the mixing chamber 104 via the transfer gas inlet port 210 and is directed through the mixing chamber body 200 and into the second outlet line 204. While the internal diameter of the first outlet line 202 remains unchanged and is open to flow (e.g., there being no pinch valve or other valve present; there being no changes over time to the cross-sectional area of the flow path from the mixing chamber 104 to the ICP torch 400, etc.), the smaller internal diameter provides flow resistance for the purge gas, causing the purge gas to preferentially travel into the second outlet line 204, through the valve 206, and into the purge location 208. In implementations, the purge location 208 includes a particle trap or filter to remove particles entrained in the purge gas. Alternatively or additionally, a particle trap or filter can be present upstream from the valve 206, such as coupled between the mixing chamber 104 and the valve 206 (e.g., as shown in FIG. 6).

Figure 5:
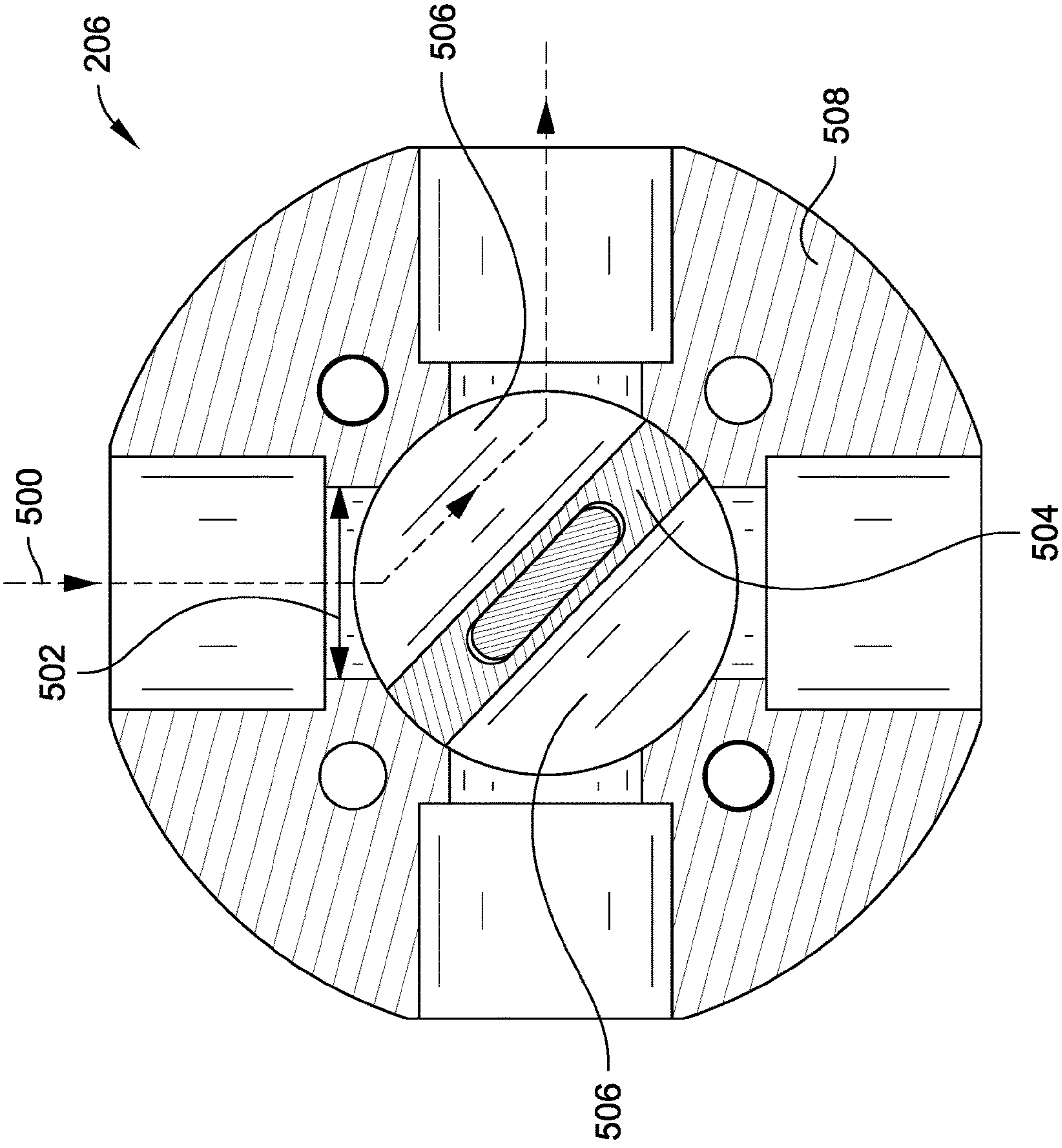
FIG. 5 is a cross-sectional view of the valve of FIG. 2.

Referring to FIG. 5, an example implementation of the valve 206 is shown. In implementations, the valve 206 includes an internal flow path 500 through the valve 206 that has an inner diameter (e.g., shown as 502) that matches the inner diameter of the second output line 204 of the mixing chamber 104 to prevent material buildup within the valve. In implementations, the internal flow path 500 has a consistent inner diameter between an input port for the valve 502 and a flow selector 504 within the valve 206 that transitions the flow path between the open and closed configurations. For example, the flow selector 504 can define one or more channels 506 to selectively, fluidically couple two ports of the valve 206 together, such as through rotation of the flow selection 504 relative to the valve body 508 defining the ports. The consistent inner diameter of the internal flow path 500 can help smooth transition of the purge gas and any particulates contained therein, without providing pinch sites, structural overlaps, or other structure that can provide sites for particulates to buildup, which can pose a risk for introducing particulates back into the mixing chamber 104 and into the first outlet line 202 for transfer to the analysis system 106.

The system 100 can include a controller to automatically control operations of various aspects of the system 100. In implementations, the system 100 includes a computer controller to coordinate operation of the valve 206 based on the status of the laser ablation system 102. For example, the controller can ensure the valve 206 is in the closed configuration to prevent the flow of gas through the second outlet line 204 when the laser ablation system 102 is undergoing a sampling procedure and can ensure the valve 206 is in the open configuration to prevent the flow of gas through the first outlet line 202 (e.g., due to the flow resistance) when the laser ablation system 102 is undergoing a purge procedure.

Figure 6:
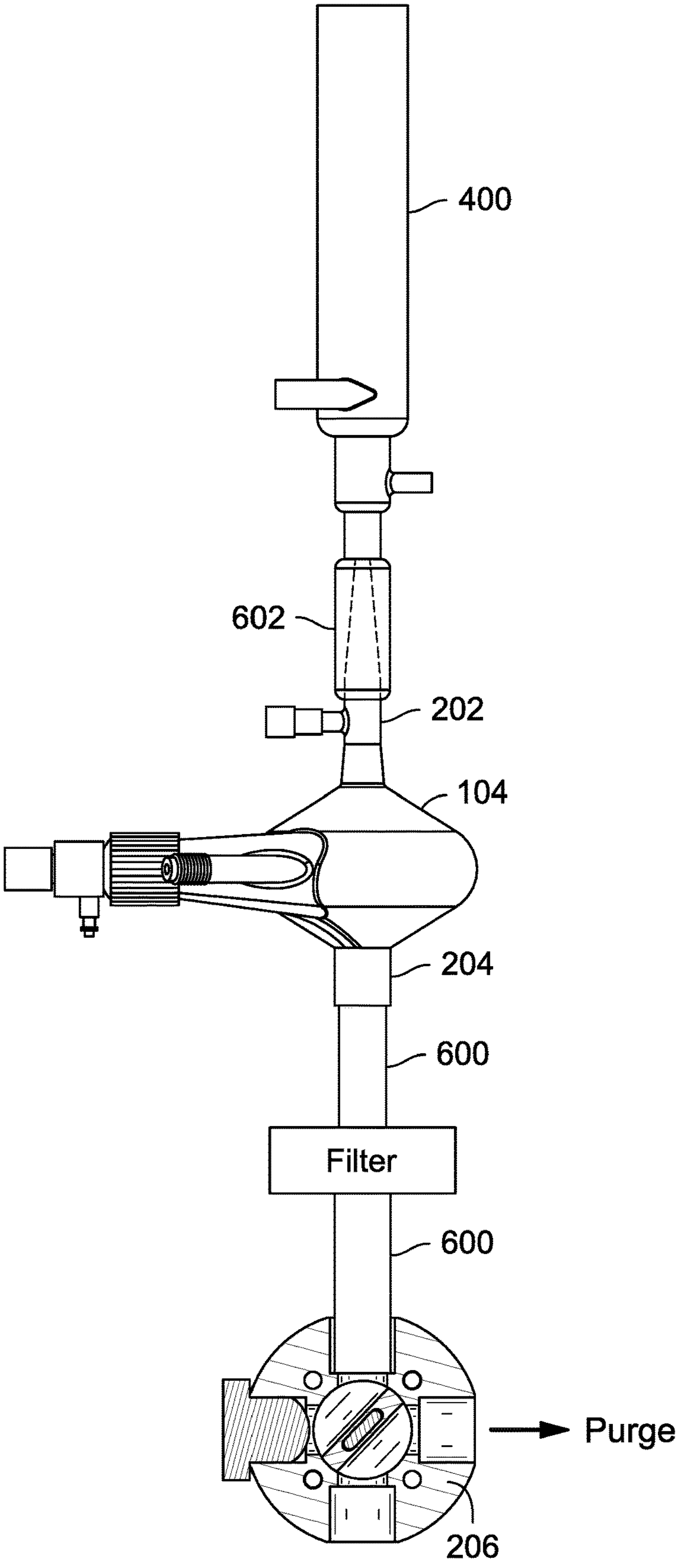
FIG. 6 is a schematic of a mixing chamber and valve configured to maintain a constant internal diameter for a gas transfer line coupled between a laser ablation system and an analytic system, in accordance with example implementations of the present disclosure.

Referring to FIG. 6, an example implementation of the system 100 is shown with the valve 206 fluidically coupled with the mixing chamber 104 via an extension 600 coupled with the second outlet line 204 and with the ICP torch 400 coupled with the first outlet line 202 via a reducer line 602. The system 100 can be configured for preparing a sample for analysis by an ICPOES system, where the mixing chamber 104, the reducer line 602 and the ICP torch 400 are provided in a vertical configuration (e.g., a vertical stack) to provide a vertical flow path for the aerosolized sample to travel from the mixing chamber 104 to the ICP torch 400. The vertical flow path can introduce less backpressure to the system 100 than when the first outlet line 202 includes one or more bends in the flow path (e.g., an example of which is shown in FIG. 4A).

When the valve 206 is in the open configuration to provide the system 100 in the purge configuration, the pressure differential between the first outlet line 202 and the second outlet line 204 can facilitate the preferential transfer of purge gas through the second outlet line 204 and not the first outlet line 202. If the first outlet line 202 has insufficient backpressure, then the preferential transfer of purge gas through the second outlet line 204 can lessen. In implementations, the reducer line 602 introduces additional backpressure to the first outlet line 202 having the vertical flow path. For instance, the reducer line 602 can have a decreasing internal cross section to reduce the internal area through which fluids can flow. For example, the reducer line 602 can transition from a first internal diameter where the reducer line 602 couples to the first outlet line 202 of the mixing chamber 104 and narrows to a second internal diameter where the reducer line 602 couples to the ICP torch 400. In implementations, the internal diameter of the flow path toward the ICP torch 400 expands downstream from the reducer line 602 (e.g., between the reducer line 602 and the ICP torch 400, within the ICP torch 400, etc.).

In implementations, the first internal diameter of the reducer line 602 can be approximately 0.2 inches and the second internal diameter of the reducer line 602 can be approximately 0.025 inches, where the reducer line 602 is approximately 0.5 inches long to transition between the first internal diameter and the second internal diameter. In implementations, the flow path downstream from the reducer line 602 expands to approximately 0.08 inches. However the system 100 is not limited to such dimensions and can include the reducer line 602 with larger or smaller internal dimensions and/or larger or smaller lengths and/or can include the expansion downstream from the reducer line 602 with larger or smaller internal dimensions without departing from the scope of the present disclosure, such as dependent on the desired flow rates through the system, the desired pressure differential between the first outlet line 202 and the second outlet line 204, the desired backpressure value for the first outlet line 202, or the like. While the reducer line 602 is shown coupled between the ICP torch 400 and the first outlet line 202 of the mixing chamber 104, it can be appreciated that the first outlet line 202 can be constructed to integrate the reducer line 602 within the first outlet line 202.

Experimentation Example—Cell Pressure

Figure 7:
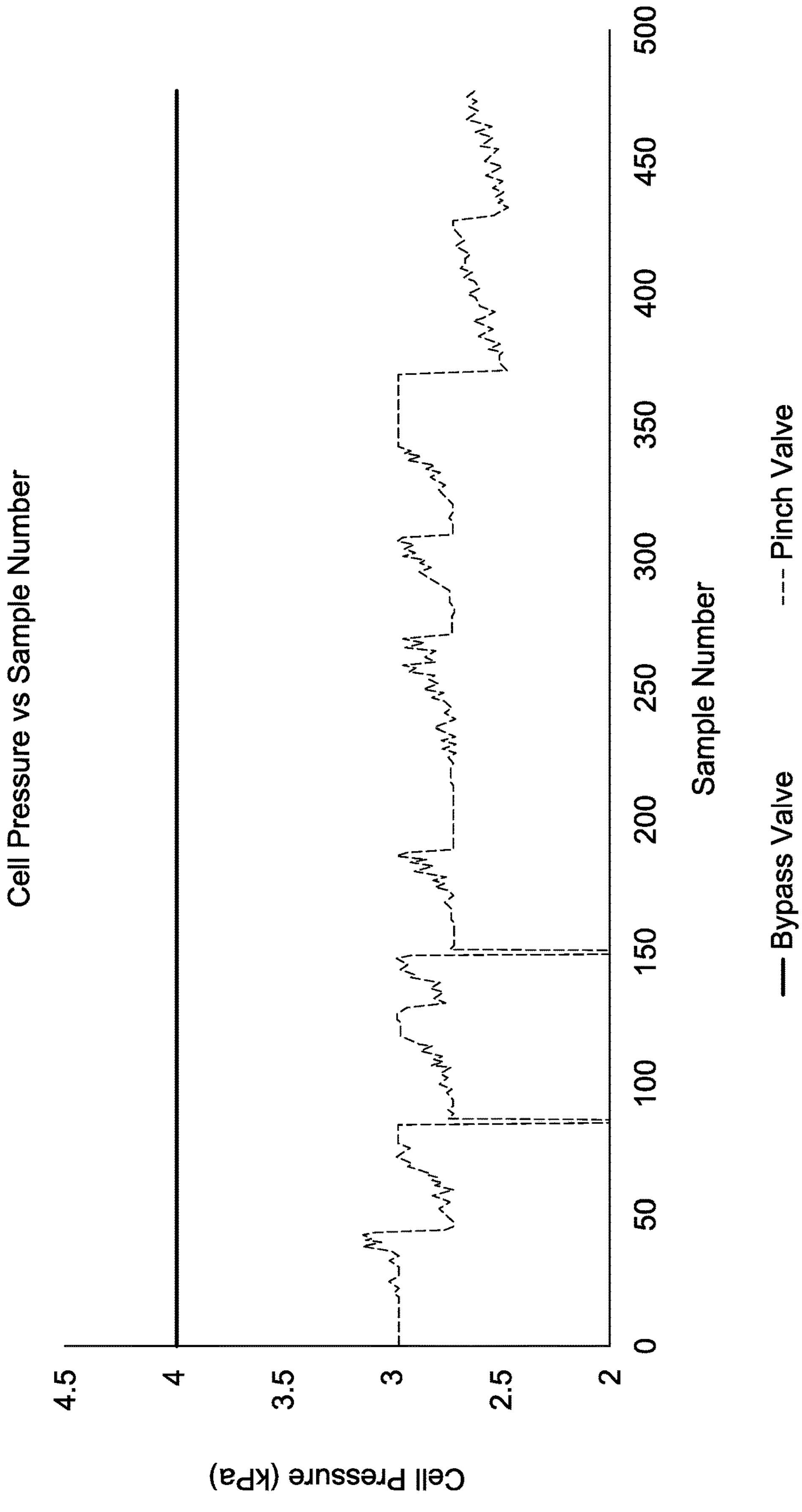
FIG. 7 is a graph of laser ablation cell pressure for multiple samples for each of a system employing a mixing chamber and valve configuration described herein and a laser ablation system utilizing a pinch valve to isolate the ICP torch from atmospheric gas introduced into the laser ablation cell between samples.

In an implementation, the system 100 was utilized to measure pressure of the ablation sample cell of the laser ablation system 102 for multiple samples as compared to a system utilizing a pinch valve to direct the flow of purge gas from the ablation sample cell. Referring to FIG. 7, the cell pressure for the system 100 and for the pinch valve system is shown for hundreds of samples, where the pinch valve system showcased significantly greater deviation and inconsistency in cell pressure over time, particularly when compared to the cell pressure for the system 100.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system for controlling flow of gas from a laser ablation cell, comprising:

an inductively-coupled plasma torch configured to ionize at least a portion of a gas from a laser ablation sample cell;

a mixing chamber fluidically coupled to the inductively-coupled plasma torch, the mixing chamber including a mixing chamber body, a transfer gas inlet coupled to the mixing chamber body and configured to receive gas from the laser ablation sample cell, a first outlet line coupled to the mixing chamber body and configured to transfer gas from the mixing chamber to the inductively-coupled plasma torch, and a second outlet line coupled to the mixing chamber body, the second gas outlet having a larger internal cross-sectional area than an internal cross-sectional area of the first outlet line; and a valve fluidically coupled to the second outlet line, the valve configured to transition between at least an open configuration configured to permit transfer gas through the second outlet line and a closed configuration configured to prevent transfer of gas through the second outlet line, wherein a difference in the respective internal cross-sectional areas of the first outlet line and the second outlet line is configured to permit transfer of a majority of the transfer gas through the second outlet line when the valve is in the open configuration to prevent extinguishing of a plasma at the inductively-coupled plasma torch.

2. The system of claim 1, wherein the first outlet line provides an unimpeded internal flow path for the transfer gas to pass from the mixing chamber to the inductively-coupled plasma torch.

3. The system of claim 1, wherein the valve defines an internal flow path having an internal diameter that matches an inner diameter of the second output line of the mixing chamber to prevent material buildup within the valve when the valve is in the open configuration.

4. The system of claim 1, wherein the mixing chamber further includes a mixing port fluidically coupled with the chamber body, the mixing port configured to receive a nebulizer gas for introduction to the transfer gas within the chamber body.

5. The system of claim 1, wherein the mixing chamber further includes a gas addition port fluidically coupled with the first outlet line, the gas addition port configured to receive a gas configured to impact with at least a portion of matrix particles present in the transfer gas in the first outlet line.

6. The system of claim 5, wherein the gas addition port is provided in a cross-flow orientation with respect to the first outlet line.

7. The system of claim 1, further comprising a reducer line coupled with the first outlet line downstream from the first outlet line, wherein the reducer line defining an internal cross-sectional area that decreases in a downstream direction from the first outlet line to the inductively-coupled plasma torch.

8. The system of claim 7, wherein a flow path downstream from the reducer line includes an internal cross-sectional area that expands to a size greater than the smallest dimension of the internal cross-sectional area of the reducer line.

9. The system of claim 7, wherein the inductively-coupled plasma torch is fluidically coupled with the reducer line, and wherein a flow path through the inductively-coupled plasma torch includes an internal cross-sectional area that is greater than the smallest dimension of the internal cross-sectional area of the reducer line.

10. The system of claim 1, wherein the mixing chamber, the first outlet line, and the inductively-coupled plasma torch are arranged in a vertical configuration.

11. A system for controlling flow of gas from a laser ablation cell, comprising:

a mixing chamber including a mixing chamber body, a transfer gas inlet coupled to the mixing chamber body and configured to receive gas from a laser ablation sample cell, a first outlet line coupled to the mixing chamber body and configured to transfer gas from the mixing chamber to an inductively-coupled plasma torch, and a second outlet line coupled to the mixing chamber body, the second gas outlet having a larger internal cross-sectional area than an internal cross-sectional area of the first outlet line; and a valve fluidically coupled to the second outlet line, the valve configured to transition between at least an open configuration configured to permit transfer gas through the second outlet line and a closed configuration configured to prevent transfer of gas through the second outlet line, wherein a difference in the respective internal cross-sectional areas of the first outlet line and the second outlet line is configured to permit transfer of a majority of the transfer gas through the second outlet line when the valve is in the open configuration to prevent extinguishing of a plasma at the inductively-coupled plasma torch.

12. The system of claim 11, wherein the first outlet line provides an unimpeded internal flow path for the transfer gas to pass from the mixing chamber to the inductively-coupled plasma torch.

13. The system of claim 11, wherein the valve defines an internal flow path having an internal diameter that matches an inner diameter of the second output line of the mixing chamber to prevent material buildup within the valve when the valve is in the open configuration.

14. The system of claim 11, wherein the mixing chamber further includes a mixing port fluidically coupled with the chamber body, the mixing port configured to receive a nebulizer gas for introduction to the transfer gas within the chamber body.

15. The system of claim 11, wherein the mixing chamber further includes a gas addition port fluidically coupled with the first outlet line, the gas addition port configured to receive a gas configured to impact with at least a portion of matrix particles present in the transfer gas in the first outlet line.

16. The system of claim 15, wherein the gas addition port is provided in a cross-flow orientation with respect to the first outlet line.

17. The system of claim 11, further comprising a reducer line coupled with the first outlet line downstream from the first outlet line, wherein the reducer line defining an internal cross-sectional area that decreases in a downstream direction from the first outlet line to the inductively-coupled plasma torch.

18. The system of claim 17, wherein a flow path downstream from the reducer line includes an internal cross-sectional area that expands to a size greater than the smallest dimension of the internal cross-sectional area of the reducer line.

19. A method for controlling flow of gas from a laser ablation cell, comprising:

transferring gas from a laser ablation sample cell to an inductively-coupled plasma torch via a transfer line that has an unimpeded internal diameter over time between individual samples taken by the laser ablation sample cell and via a mixing chamber fluidically coupled with each of a valve and the inductively-coupled plasma torch, the mixing chamber including a mixing chamber body, a first outlet line coupled to the mixing chamber body and configured to transfer gas from the mixing chamber to an inductively-coupled plasma torch, and a second outlet line coupled to the mixing chamber body, the second gas outlet having a larger internal cross-sectional area than an internal cross-sectional area of the first outlet line, and wherein the valve is fluidically coupled to the second outlet line, the valve configured to transition between at least an open configuration configured to permit transfer gas through the second outlet line and a closed configuration configured to prevent transfer of gas through the second outlet line; and preventing transfer of gas from the laser ablation sample cell to the inductively-coupled plasma torch through operation of the valve fluidically coupled between the laser ablation sample cell and the inductively-coupled plasma torch.

* * * * *